United States Patent
Mulas et al.

(10) Patent No.: US 11,857,895 B2
(45) Date of Patent: Jan. 2, 2024

(54) BI-PHASE (SCOTT-T) TRANSFORMER DOUBLE VOLTED AC ELECTROSTATIC COALESCER

(71) Applicant: Saudi Arabian Oil Company, Dhahran (SA)

(72) Inventors: Simone Mulas, Dhahran (SA); Pier Domini, Abqaiq (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/453,415

(22) Filed: Nov. 3, 2021

(65) Prior Publication Data
US 2023/0136607 A1    May 4, 2023

(51) Int. Cl.
| | |
|---|---|
| B01D 17/06 | (2006.01) |
| B01D 17/02 | (2006.01) |
| B01D 17/04 | (2006.01) |
| B03C 11/00 | (2006.01) |
| C10G 33/02 | (2006.01) |

(52) U.S. Cl.
CPC ......... *B01D 17/06* (2013.01); *B01D 17/0214* (2013.01); *B01D 17/045* (2013.01); *B03C 11/00* (2013.01); *C10G 33/02* (2013.01)

(58) Field of Classification Search
CPC ................................. C10G 33/02; B01D 17/06
See application file for complete search history.

(56) References Cited

U.S. PATENT DOCUMENTS

| | | | | | |
|---|---|---|---|---|---|
| 2,033,420 | A | * | 3/1936 | Eddy ...................... | C10G 33/02 204/671 |
| 2,033,429 | A | * | 3/1936 | Hanson .................. | C10G 33/02 204/563 |
| 2,527,690 | A | * | 10/1950 | Turner ................... | C10G 33/02 204/672 |

(Continued)

FOREIGN PATENT DOCUMENTS

| | | |
|---|---|---|
| CN | 2874736 Y | 2/2007 |
| CN | 102061188 A | 5/2011 |

(Continued)

OTHER PUBLICATIONS

Circuit Globe, Scott-T Transformer Connection (Year: 2020).*
(Continued)

*Primary Examiner* — Hosung Chung
(74) *Attorney, Agent, or Firm* — Leason Ellis LLP

(57) ABSTRACT

An electrostatic coalescer apparatus for separating water from a crude oil emulsion comprises a vessel housing having a cavity, an inlet for receiving a crude oil emulsion and outlets for water and purified crude oil. First and second pairs of electrodes are positioned in the vessel cavity. A first Scott-T transformer circuit is coupled to the first pair of electrodes and a second Scott-T transformer circuit is coupled to the second pair of electrodes. The first and second Scott-T transformer circuit receive as an input a 3-phase power supply and output a 2-phase high voltage signal pairs of electrodes. The 2-phase voltage generated between the first pair of electrodes is of the same amplitude and phase as the voltage generated between the second pair of electrodes via the respective Scott-T transformer circuits. A method comprises steps performed during operation of the apparatus.

8 Claims, 2 Drawing Sheets

(56) References Cited

U.S. PATENT DOCUMENTS

| | | | |
|---|---|---|---|
| 3,794,578 | A | 2/1974 | Watson |
| 4,056,451 | A | 11/1977 | Hodgson |
| 4,511,452 | A * | 4/1985 | Robinson .............. B01D 17/06 |
| | | | 204/662 |
| 4,702,815 | A | 10/1987 | Prestridge et al. |
| 5,219,471 | A * | 6/1993 | Goyal ................. B01D 17/042 |
| | | | 208/182 |
| 5,464,522 | A | 11/1995 | Edmondson |
| 6,391,268 | B1 | 5/2002 | Berry et al. |
| 9,039,884 | B2 | 5/2015 | Bjorklund et al. |
| 9,424,987 | B2 | 8/2016 | Duval |
| 9,764,336 | B2 | 9/2017 | Sams et al. |
| 10,023,811 | B2 | 7/2018 | Soliman et al. |
| 10,112,850 | B2 | 10/2018 | Mandewalkar et al. |
| 10,260,010 | B2 | 4/2019 | Soliman |
| 10,590,017 | B2 | 3/2020 | Mandewalkar et al. |
| 10,669,489 | B2 | 6/2020 | Thomas et al. |
| 10,918,972 | B2 | 2/2021 | Leitner et al. |
| 11,034,893 | B2 | 6/2021 | Soliman et al. |
| 2009/0159426 | A1 | 6/2009 | Chen |
| 2019/0112206 | A1 | 4/2019 | Mandewalkar |
| 2021/0135579 | A1 | 5/2021 | Mandewalkar et al. |

FOREIGN PATENT DOCUMENTS

| | | |
|---|---|---|
| CN | 103023367 A | 4/2013 |
| EP | 3563934 A1 | 11/2019 |
| WO | 2020106937 A1 | 5/2020 |

OTHER PUBLICATIONS

Michaelsen—Machine Translation and Original Patent—No. 337688-B1 (Year: 2016).*

Dmitriev; Removal of moisture from contaminated transformer oil in rectangular separators.; s://www.researchgate.net/publication/335069394_Removal_of_moisture_from_contaminated_transformer_oil_in_rectangular_separators/link/5d4d79004585153e5948e929/download.; Jan. 1, 2019.

International Search Report and Written Opinion in corresponding PCT Application No. PCT/US2022/077454, dated Dec. 5, 2022; 11 pages.

Ciontea Catalin Iosif et al.; Propagation of Voltage Sags and Under-voltages through Scott Transformers; 2021 International Aegean Conference on Electrical Machines and Power Electronics (ACEMP) & 2021 International Conference on Optimazation of Electrical and Electronic Equipment (OPTIM), IEEE, Sep. 2, 2021, pp. 48-53.

* cited by examiner

BI-PHASE (SCOTT-T) TRANSFORMER DOUBLE VOLTED AC ELECTROSTATIC COALESCER

FIELD OF THE DISCLOSURE

The present disclosure relates to chemical separation and more particularly relates to an apparatus for separating water from oil-water mixture by using Bi-phase (Scott-T) Transformers to transmit high voltage electricity within a coalescer vessel in order to promote coalescence and separation of water from the oil-water mixture.

BACKGROUND OF THE DISCLOSURE

In crude oil exploration and production, various fluid streams extracted can contain impurities including appreciable amounts of water, salt and other undesirable constituents. So-called "upstream" processes are therefore taken to remove the impurities, particularly water, from the fluid stream. Research into capabilities for removal of such impurities has increased in importance due to the possibility of exploiting deposits that have been previously disposed of for containing too much water. Thus far, the two most common techniques for removal water is by gravitational separation and electrostatic coalescing. The gravitational technique, which is the most common method, separates water from crude oil by differences in their density. Typically, oil production facilities use gravity separators to remove most of the water associated to the crude oil production. However, when the water is dispersed in small or microscopic droplets in a continuous phase water/oil emulsion, gravitational separation does not work well, with the result that an appreciable amount of water tends to remain.

A more efficient technique for separating continuous phase emulsions is to remove the water electrostatically by passing the emulsion through an established electric field. One common apparatus to perform this procedure includes housing charged electrodes spaced apart within a vessel known as an electrostatic coalescer. The coalescer typically includes an emulsion inlet, an outlet for a lighter component (oil) and another outlet for the heavier component (water). The electric field acts to augment the size of water droplets within the emulsion. The larger droplet can then be more efficiently separated by gravity from the oil and then removed from the vessel.

Certain conventional electrostatic designs use alternating current (AC) current transformers to transmit a high voltage to the electrodes housed within the vessel. The most frequently used configuration includes three single phase AC transformers installed on the vessel and connected to the electrodes within the vessel through a high voltage entrance bushing. Typically, in a step-up transformer each single-phase transformer is equipped with a single electrical coil of wire called the "primary winding" (lower voltage) and another called the "secondary winding" (stepped up to higher voltage). Power is typically provided to the primary winding via a three-phase power supply with two phases connected to each transformer (phase to phase, delta connection). One end of the secondary winding of each transformer is connected to the electrodes while the other end of the secondary winding is grounded.

The conventional designs include three high voltage connections (one from each transformer) with the same voltage level and mutual phase shifts ($\varphi$) of 120 degrees. Set of electrodes are connected to one of the three transformers. This configuration generates electrostatic fields with same voltage intensity and phase shift ($\varphi$) of 120 degrees. However, the use of single-phase transformers in this design requires non-symmetrical sets of electrodes that generate unsynchronized electrostatic fields with phase shifts. This design configuration suffers from inefficiencies in that the phase shifts of the AC fields are not optimal for water droplet aggregation and separation. Furthermore, the conventional design is subject to undesired voltage drops and power losses.

SUMMARY OF THE DISCLOSURE

In a first aspect, the present disclosure describes an electrostatic coalescer apparatus for separating water from a crude oil emulsion. The coalescer apparatus comprises a vessel housing having a cavity, an inlet for receiving a crude oil emulsion, at least one outlet for output water removed from the emulsion, and a further outlet for purified crude oil. The apparatus further comprises first and second pairs of electrodes positioned adjacently within the cavity of the vessel. A first Scott-T transformer circuit is coupled to the first pair of electrodes. The first Scott-T transformer receives as an input a 3-phase power supply and outputs a 2-phase high voltage signal to the first pair of electrodes. A second Scott-T transformer circuit is coupled to the second pair of electrodes. The second Scott-T transformer circuit receives as an input a 3-phase power supply and outputs a 2-phase high voltage signal to the second pair of electrodes. The 2-phase voltage generated between the first pair of electrodes by the first Scott-T transformer circuit is of a same amplitude and phase as a voltage generated between the second pair of electrodes by the second Scott-T transformer circuit.

In a preferred implementation, the electrodes in the first pair and the electrodes in the second pair extend in a horizontal orientation.

In some embodiments, the first pair of electrodes includes an upper electrode and a lower electrode. The upper electrode receives a signal from the first transformer circuit of a first phase and the lower electrode receives a signal from the first transformer circuit of a second phase 90 degrees shifted with respect to the first phase Similarly, the second pair of electrodes includes an upper electrode and a lower electrode and the upper electrode and lower electrodes receive signals from the second transformer circuit that are 90 degrees shifted with respect to each other.

The first and second Scott-T transformer circuit preferably each include a main transformer and a 86.6% ($0.5\times\sqrt{3}$) ratio teaser transformer that taps the main transformer in a 1:1 ratio. The main transformer includes a primary winding having a first end coupled to a one of the phases of the three-phase power supply, and a second end coupled to another of the phases of the three-phase power supply. The Main transformer center tap then connects to one end of Teaser transformer while the other end connects to the remaining phase. The main transformer includes a secondary winding having a first end coupled to a first one of the electrodes of the first or second pairs of electrodes, and a second end coupled to ground. In some implementations, the teaser transformer includes a secondary winding having a first end coupled to a second one of the electrodes of the first or second pairs of electrodes, and a second end coupled to ground.

In certain embodiments, the voltage generated within first and second pairs of electrodes is in a range of 15 Kilovolts to 25 Kilovolts.

In another aspect, the present disclosure describes a method removing water and soluble impurities from a crude oil emulsion. The method comprises introducing the crude oil emulsion into an electrostatic coalescer apparatus having a vessel with first and second pairs of electrodes, generating a homogenous bi-phase AC voltage signal between electrodes of the first and second pairs of electrodes; wherein water present in the emulsion aggregates and separates from the crude oil emulsion by exposure to the high voltage signal within the vessel, and removing the aggregated water from the vessel of the apparatus.

In some implementations, the aggregated water drops by force of gravity to the bottom of the vessel and is removed from the vessel via outlets.

These and other aspects, features, and advantages can be appreciated from the following description of certain embodiments and the accompanying drawing figures and claims.

DETAILED DESCRIPTION OF CERTAIN EMBODIMENTS OF THE DISCLOSURE

The present disclosure describes an electrostatic coalescer apparatus and associated method for separating water from water-in-oil mixtures that uses bi-phase (Scott-T) transformers to step up voltage and transmit high voltage electricity to the electrodes housed in the coalescer apparatus. The Scott-T transformer is a transformer circuit that is used to produce two-phase electric power, with a phase shift of 90 degrees, from a three-phase source.

Figures 1A, 1B:
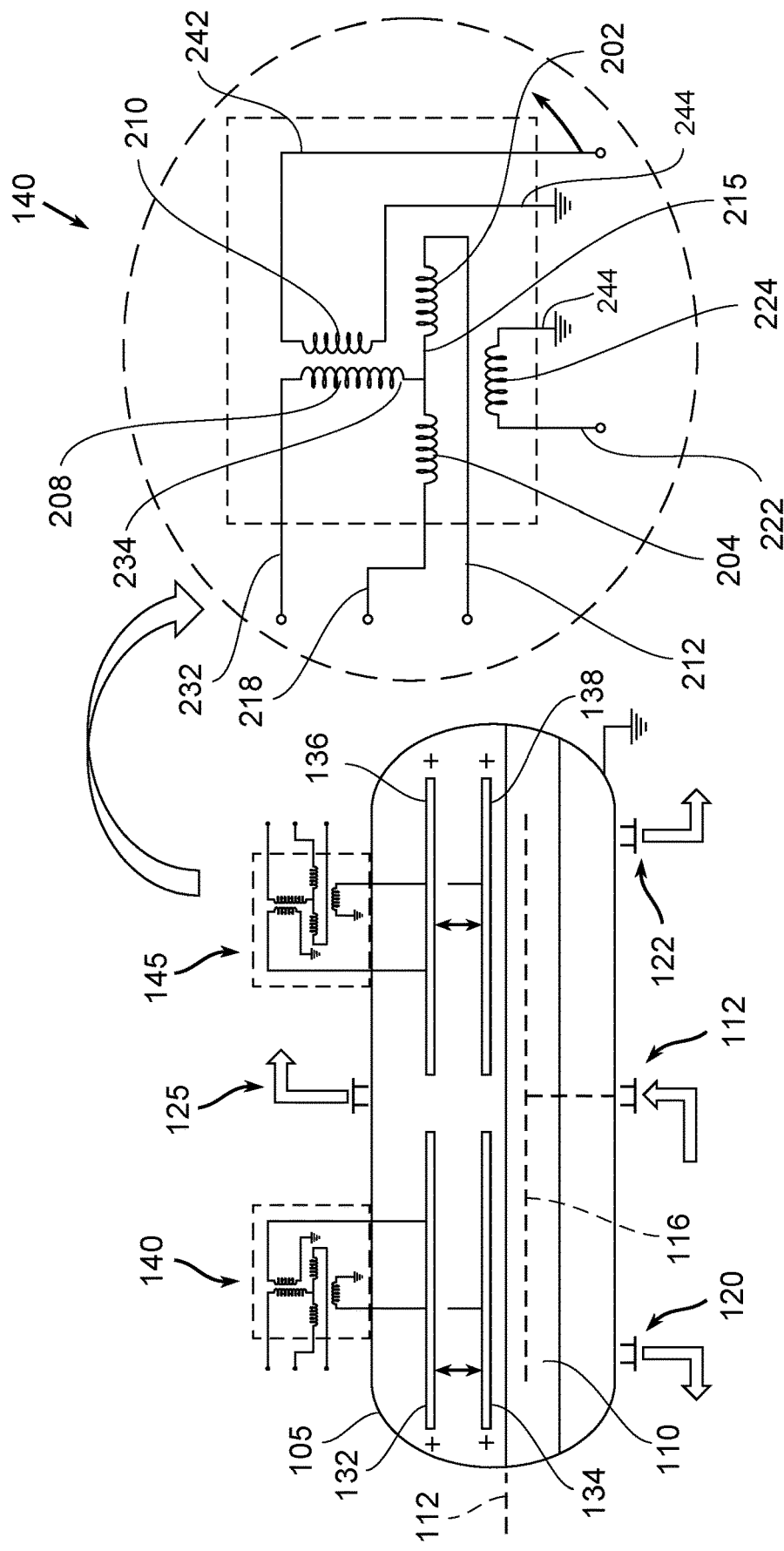
FIG. 1A is a schematic diagram of a bi-phase transformer electrostatic coalescer apparatus according to an embodiment of the present disclosure.
FIG. 1B is an enlarged view of a portion of FIG. 1A illustrating an example configuration of a bi-phase Scott-T transformer employed according to the present disclosure.

FIG. 1A is a schematic cross-sectional view an embodiment of an electrostatic coalescer apparatus 100 according to the present disclosure. The coalescer is housed in a vessel 105 that defines a cavity 110 and a longitudinal axis 112. The vessel 105 features an emulsion inlet 115 for receiving a crude oil emulsion that can contain appreciable amounts of water, salt and other undesirable constituents. In some embodiments the emulsion inlet 115 is positioned at the bottom of the vessel 105 and the emulsion enters the vessel under positive pressure. The emulsion inlet can lead through an inlet header 116 that conveys the input emulsion deeper into the vessel to avoid the presence of accumulated water. At least one outlet for water is positioned at the vessel 105. In the embodiment shown in FIG. 1A, there are two such water outlets 120, 122. After water has been separated from the emulsion as described further below, the water exits from the vessel via outlets 120, 122 by force of gravity. The crude oil from which impurities have been removed exits from the vessel via a crude outlet 125 that can be positioned, as shown, at the top of the vessel 105.

Within the vessel 105, two pairs of electrodes are positioned horizontally adjacent to each other. The first pair of electrodes includes electrodes 132 and 134 and the second pair of electrodes includes electrodes 136 and 138. In the first pair electrodes 132 is positioned above electrode 134. In the second pair electrode 136 is positioned above electrode 138. All of the electrodes 132, 134, 136, 138 extend horizontally (in the direction of the longitudinal axis 112). In some embodiments each of the electrodes 132, 134, 136, 138 comprises a layer of charged grids. The first pair of electrodes 132/134 is connected to a first bi-phase Scott-T transformer circuit 140. The second pair of electrodes 136/138 is connected to a second bi-phase Scott-T transformer circuit 145. The coalescer apparatus 100 can be considered to be "double-volted" in that each electrode pair includes two layers of grids that are connected to transformers. The pairs of electrodes 132/134, 136/138 are symmetrically positioned about a center of the vessel (along the longitudinal axis 112). Together, the electrodes cover approximately the entire length of the vessel.

In some embodiments, the first and second bi-phase Scott-T transformer circuits are equivalent. An enlarged view showing a configuration of the first bi-phase Scott-T transformer circuit 140 is shown in FIG. 1B. As shown, the b-phase Scott-T transformer circuit 145 includes two transformers (T1, T2) that are configured perpendicularly to each other, hence the "T" nomenclature. The first transformer (T1), which is the "main" transformer, consists of primary winding that is split between a first section 202 and a second section 204 and a secondary winding 216. The second transformer (T2), which is the "teaser" transformer, consists of a primary winding 208 and a secondary winding 210.

A first end 212 of the first second of primary winding 202 of the first transformer (T1) is coupled to a first phase (1)=0° of a three-phase power supply. The second end of the first section 202 is connected to the first end of the second section 204 by a conductor 215. A second end of the section 202 of the primary winding of the first transformer (T1) is coupled to a conductor 215 (e.g., an electrical wire) that connects the first section to second section 204. The second end 218 of the second section 204 is coupled to a second phase (Φ=120°) of a three-phase power supply. The first end 222 of the secondary winding 206 of T1 is coupled to electrode 132 of the first electrode pair via a high-voltage entrance bushing. The phase of the signal provided to the electrode is (Φ=90°), one phase of a two-phase system. A second end 224 of the secondary winding 206 of the first transformer (T1) is grounded.

Turning to the second transformer (T2), the first end of the primary winding 232 taps the center of the primary winding 208 of T1 (i.e. between sections 202, 204) in a 1:1 ratio. That is, 50 percent of the windings of the primary of the first transformer (T1) are in section 202, and 50 percent are in section 204. The second end 234 of the primary winding 208 of transformer (T2) is coupled to a third phase (Φ=240°) of a three-phase power supply. The second end taps the primary winding 208 of the second transformer (T2) is an 86.6% (0.5×√3) ratio. The first end 242 of the secondary winding 210 of the second transformer (T2) is the connected to electrode 134 of the first electrode pair via a high-voltage entrance bushing. The phase of the signal provided to the electrode is (Φ=90°), the other phase of the two-phase system. A second end 244 of the secondary winding 210 of the first transformer (T2) is grounded.

The second transformer circuit 145 of the coalescer apparatus is coupled to the three-phase power supply and the second pair of electrodes 136/138 in the same manner so that there is a symmetry between the way the first and second electrode pairs 132/134, 136/138 are electrically energized.

In the configuration shown in FIG. 1B, the bi-phase Scott-T transformer is a step-up transformer and the secondary windings are at a higher voltage with respect to the primary windings. As noted, the first sides of the secondary windings of the first and second transformers (T1), (T2) are connected to the inside electrodes inside the vessel 105 while the other sides are grounded. This configuration generates high-voltage two-phase power signal with the same voltage and a phase shift of 90 degrees from a three-phase power supply. In each pair of electrodes 132/134, 136/138, the top electrode is coupled to the ($\Phi=0°$) phase while the bottom electrode is coupled to the ($\Phi=90°$) phase. The normalized potential difference between the electrode is equivalent to sin x–cos x, which is another sinusoidal signal. This configuration generates a more uniform and homogenous electrostatic field with same voltage density and no phase shift. In addition, in the embodiment of FIGS. 1A and 1B, only two transformers need to be employed, in contrast to the conventional three-phase coalescer that uses three transformers.

Figure 2B:
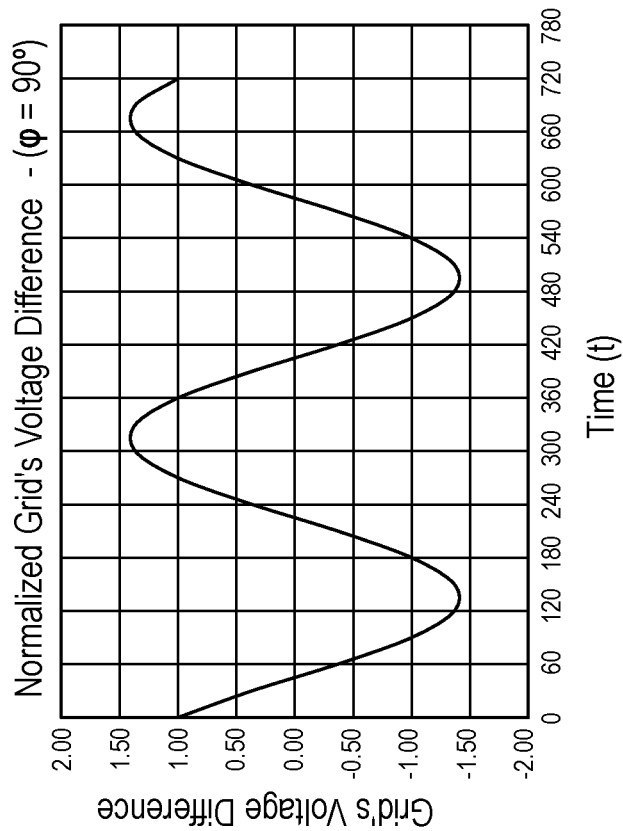
FIG. 2B is an exemplary graph of normalized grid's differential voltage over time generating an AC electric field that can be used in the bi-phase coalescer apparatus according to the present disclosure.
Figure 2A:
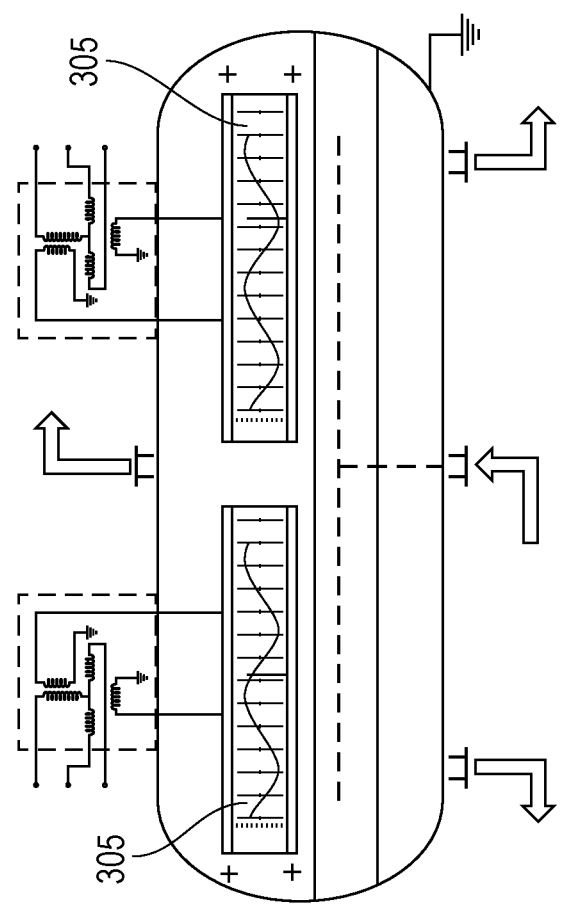
FIG. 2A shows another view of the bi-phase coalescer apparatus shown in FIG. 1A illustrating a wave form of differential voltage between the symmetric plates supplied by bi-phase phase transformers according to an embodiment of the present disclosure.

FIG. 2A is a schematic cross-sectional view of the same embodiment of the coalescer shown in FIG. 1A but this figure shows the waveform of voltage intensity between the symmetric electrodes supplied by the disclosed Scott-T transformer circuits. As shown, there is a first AC high voltage waveform 305 that represents the voltage between the first electrode 132 and the second electrode of the first electrode pair of the coalescer. A second AC high voltage waveform 310 represents the voltage between the first electrode 136 and the second electrode 138 of the second electrode pair. A similar pattern is generated between the bottom plates and the interface level that forms as water coalesces and separates from the crude oil emulsion. This water then exits from the vessel via the water outlets 120, 122. Some of the soluble impurities present in the original crude oil emulsion are removed with the water.

As illustrated, the waveforms 305, 310 have the same amplitude and phase, providing a uniform electric field throughout the coalescer. The uniform field, in turn, creates homogeneous condition for the aggregation of water throughout the vessel, improving the efficiency of the coalescing process. FIG. 2B is an exemplary graph showing a voltage density between the electrodes (of each pair) over time. In various implements, voltage levels in the vessel can be maintained within a range of 15 Kilovolts to 25 Kilovolts which is suitable for inducing sufficient aggregation of water molecules to ensure their separation from the crude oil emulsion.

There are a number of advantages to the coalescer apparatus powered using bi-phase Scott-T transformers according to the present disclosure. The use of Scott-T Transformers for AC electrostatic coalescers reduces the number of transformers required for each vessel to 2 from 3; by this measure, the possibility of unbalanced voltage on the primary windings is reduced. The reduction of the possibility of unbalanced voltages, in turn, reduces power loses over time, avoids undesired voltage drops, and increases transformer life. This will result in a more robust and resilient design with a power cable redundancy. In some embodiments, the two bi-phase Scott-T transformer circuits coupled to the vessel can be provided with an independent power supply. Therefore, if one power supply is lost, only one of the transformer circuits will be down and the other one can keep working and provide a partial treatment of the emulsion, mitigating the upset. Importantly, the disclosed coalescer using bi-phase Scott-T transformers enables the employment of symmetric electrodes with a more uniform and synchronized (no phase shift) electrostatic field throughout the entire length of the vessel. This measure improves water droplet aggregation (coalescing) and separation.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components or steps described and illustrated with reference to the figures are required for all embodiments or arrangements.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and "comprising", when used in this specification, specify the presence of stated features, integers, steps, operations, elements, or components, but do not preclude the presence or addition of one or more other features, integers, steps, operations, elements, components, or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An electrostatic coalescer for separating water from a crude oil emulsion comprising:
   a vessel housing having a cavity, an inlet for receiving a crude oil emulsion, at least one outlet for output water removed from the emulsion, and a further outlet for purified crude oil;
   a first pair of electrodes positioned within the cavity of the vessel housing;
   a second pair of electrodes positioned adjacent to the first pair of electrodes within the cavity of the vessel housing;
   a first Scott-T transformer circuit coupled to the first pair of electrodes, the first Scott-T transformer circuit receiving as an input a 3-phase power supply and outputting a 2-phase high voltage signal to the first pair of electrodes; and a second Scott-T transformer circuit coupled to the second pair of electrodes, the second Scott-T transformer circuit receiving as an input a 3-phase power supply and outputting a 2-phase high voltage signal to the second pair of electrodes;

wherein the 2-phase voltage signal generated between the first pair of electrodes by the first Scott-T transformer circuit is of a same amplitude and phase as a voltage signal generated between the second pair of electrodes by the second Scott-T transformer circuit, whereby a uniform and synchronized electrostatic field is established throughout the entire length of the vessel free of any phase shift in the electrostatic field resulting in water droplet coalescing and separation from the crude oil in the crude oil emulsion.

2. The electrostatic coalescer of claim 1, wherein the electrodes in the first pair and the electrodes in the second pair extend in a horizontal orientation.

3. The electrostatic coalescer of claim 1, wherein:

the first pair of electrodes includes an upper electrode and a lower electrode, the upper electrode receiving a signal from the first transformer circuit of a first phase and the lower electrode receiving a signal from the first transformer circuit of a second phase 90 degrees shifted with respect to the first phase; and the second pair of electrodes includes an upper electrode and a lower electrode, the upper electrode receiving a signal from the second transformer circuit of a first phase and the lower electrode receiving a signal from the second transformer circuit of a second phase 90 degrees shifted with respect to the first phase.

4. The electrostatic coalescer of claim 1, wherein the first and second Scott-T transformer circuits each include a main transformer and a teaser transformer that taps the main transformer in a 1:1 ratio.

5. The electrostatic coalescer of claim 4, wherein the main transformer includes a primary winding having a first end coupled to one of the phases of the three-phase power supply, and a second end coupled to another of the phases of the three-phase power supply.

6. The electrostatic coalescer of claim 4, wherein the main transformer includes a secondary winding having a first end coupled to a first one of the electrodes of the first or second pairs of electrodes, and a second end coupled to ground.

7. The electrostatic coalescer of claim 6, wherein the teaser transformer includes a secondary winding having a first end coupled to a second one of the electrodes of the first or second pairs of electrodes, and a second end coupled to ground.

8. The electrostatic coalescer of claim 1, wherein the voltage generated within first and second pairs of electrodes is in a range of 15 Kilovolts to 25 Kilovolts.

* * * * *